(12) United States Patent
Huai et al.

(10) Patent No.: US 6,928,484 B1
(45) Date of Patent: Aug. 9, 2005

(54) METHOD AND APPARATUS FOR DISCOVERING EDGE-DISJOINT SHORTEST PATH PAIRS DURING SHORTEST PATH TREE COMPUTATION

(75) Inventors: Jin Huai, Rohnert Park, CA (US); Gary Baldwin, Santa Rosa, CA (US); Anix Anbiah, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,835

(22) Filed: Jan. 18, 2000

(51) Int. Cl.$^7$ .......................................... G06F 15/173
(52) U.S. Cl. ................. 709/239; 709/240; 709/241; 709/242; 709/243; 370/395.42; 370/238
(58) Field of Search ............................. 709/239, 240, 709/241, 242, 243; 370/395.42, 238

(56) References Cited

U.S. PATENT DOCUMENTS

| | | | | |
|---|---|---|---|---|
| 4,956,835 A | * | 9/1990 | Grover ........................ | 370/228 |
| 4,967,345 A | * | 10/1990 | Clarke et al. ................ | 128/898 |
| 5,812,524 A | * | 9/1998 | Moran et al. .............. | 340/2.23 |
| 5,881,243 A | * | 3/1999 | Zaumen et al. ............. | 118/418 |
| 6,047,331 A | * | 4/2000 | Medard et al. ............. | 709/239 |
| 6,061,736 A | * | 5/2000 | Rochberger et al. ........ | 370/406 |
| 6,130,875 A | * | 10/2000 | Doshi et al. ................ | 370/225 |
| 6,304,349 B1 | | 10/2001 | Alanyali et al. ............ | 359/127 |
| 6,324,162 B1 | | 11/2001 | Chaudhuri ................... | 370/225 |
| 6,347,078 B1 | * | 2/2002 | Narvaez-Guarnieri et al. ........................... | 370/230 |
| 6,498,778 B1 | | 12/2002 | Cwilich et al. ............. | 370/216 |

* cited by examiner

*Primary Examiner*—Glenton B. Burgess
*Assistant Examiner*—Kevin Parton
(74) *Attorney, Agent, or Firm*—Ritter, Lang & Kaplan LLP (57) ABSTRACT

A method for identifying and choosing a shortest path segment that has an alternate edge disjoint path segment. While routing Unidirectional Path Switched Ring (UPSR) path segments in a graph, there may be several equal distance paths to choose the shortest path from. Choosing a certain path as the shortest path may minimize or eliminate the chance of finding an alternative path segment. A method is provided such that if multiple shortest paths from the source node to a particular destination node exist, the method selects the shortest path which has an alternate edge disjoint path, and which can be used for path protection. The particular shortest path chosen by the method is not necessarily the first shortest path constructed.

24 Claims, 8 Drawing Sheets

| ORDERED STEP SEQUENCE | SET OF EVALUATED NODES E | SET OF REMAINING NODES R | SET OF ORDERED PATHS O |
|---|---|---|---|
| 1 | N1 | N2, N3, N4 | N1-N3 = 10<br>N1-N2 = 40 |
| 2 | N1, N3 | N2, N4 | N1-N3-N4 = 20<br>N1-N2 = 40 |
| 3 | N1, N3, N4 | N2 | N1-N3-N4-N2 = 30<br>N1-N2 = 40 |
| 4 | N1, N3, N4, N2 | NULL | N1-N2 = 40<br>N1-N3-N4-N2-N1 = 70 |
| 5 | N1, N2, N3, N4 | NULL | N1-N3-N4-N2-N1 = 70 |

| ORDERED STEP SEQUENCE | SET OF EVALUATED NODES E | SET OF REMAINING NODES R | SET OF ORDERED PATHS O AND COST METRICS |
|---|---|---|---|
| 1 | A | B, C, D, F, V | A—D = 10<br>A—B = 10 |
| 2 | A, D | C, B, F, V | A—B = 10<br>A—D—C = 20<br>A—D—F = 20 |
| 3 | A, B, D | C, F, V | A—D—C = 20    (1ST SP TO C)<br>A—D—F = 20<br>A—B—C = 20 |
| 4 | A, B, C, D | F, V | A—B—C = 20    (2ND SP TO C)<br>A—D—F = 20<br>A—D—C—V = 30 |
| 5 | A, B, C, D | F, V | A—D—F = 20<br>A—D—C—V = 30<br>A—B—C—V = 30<br>A—B—C—D = 30 |
| 6 | A, B, C, D, F | V | A—D—C—V = 30    (1ST SP TO V)<br>A—B—C—V = 30<br>A—D—F—V = 30<br>A—B—C—D = 30 |
| 7 | A, B, C, D, F, V | NULL | A—B—C—V = 30    (2ND SP TO V)<br>A—D—F—V = 30<br>A—B—C—D = 30 |
| 8 | A, B, C, D, F, V | NULL | A—D—F—V = 30    (3RD SP TO V)<br>A—B—C—D = 30 |
| 9 | A, B, C, D, F, V | NULL | A—B—C—D = 30 |
| 10 | A, B, C, D, F, V | NULL | NULL |

METHOD AND APPARATUS FOR DISCOVERING EDGE-DISJOINT SHORTEST PATH PAIRS DURING SHORTEST PATH TREE COMPUTATION

CROSS-REFERENCES

This application is related to application, application Ser. No. 09/478,287, filed on Jan. 5, 2000, entitled "Automatic Propagation of Circuit Information in a communications Network," of which, Jin Huai is the inventor, and which describes a method of automatically detecting network topology and protection information. The aforementioned application is incorporated herein by reference, but is not admitted to be prior art.

BACKGROUND OF THE INVENTION

This invention deals generally with the routing of communication paths within complex multi-nodal communication networks. In particular, the invention addresses how to choose one of multiple equal cost shortest paths such that an alternate edge disjoint path can be found and a virtual Unidirectional Path Switched Ring (UPSR) established.

The Shortest Path Tree (SPT) or Dijkstra's algorithm is a procedure used in state link protocol networks to optimize routing by finding the shortest path, or least cost path, between two network elements. A path between any two network elements, or nodes, consists of individual and contiguous path segments that begin at the source node and terminate on the target node. Path segments consist of individual and contiguous links. A link is a communications channel between two adjacent nodes.

Given network nodes, which are connected by links, the question arises as to which is the shortest path between any two nodes, A and B. The term "shortest path" is relative to a cost metric, which is defined for the links and path segments that are part of the network. For example, the monthly cost of an optical link operating at Optical Carrier (OC)-3 could represent a cost metric. The shortest path is that path between two network elements which has the least cost, where the cost is the sum of the predefined costs of traversing each link or path segment in the path.

Figure 1:
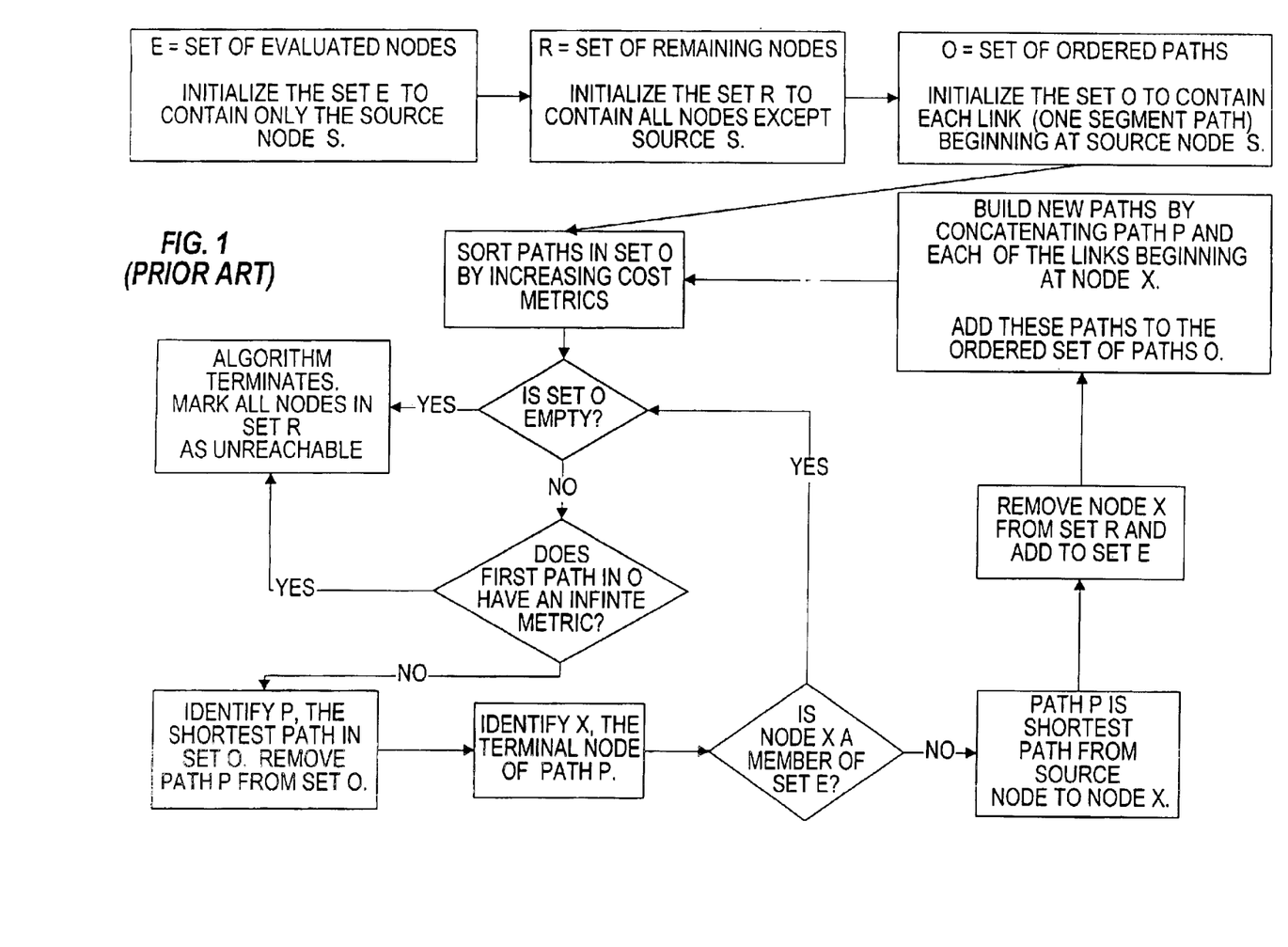
FIG. 1 illustrates a process flow of a generic form of the prior art Dijkstra's SPT algorithm.
Figure 2:
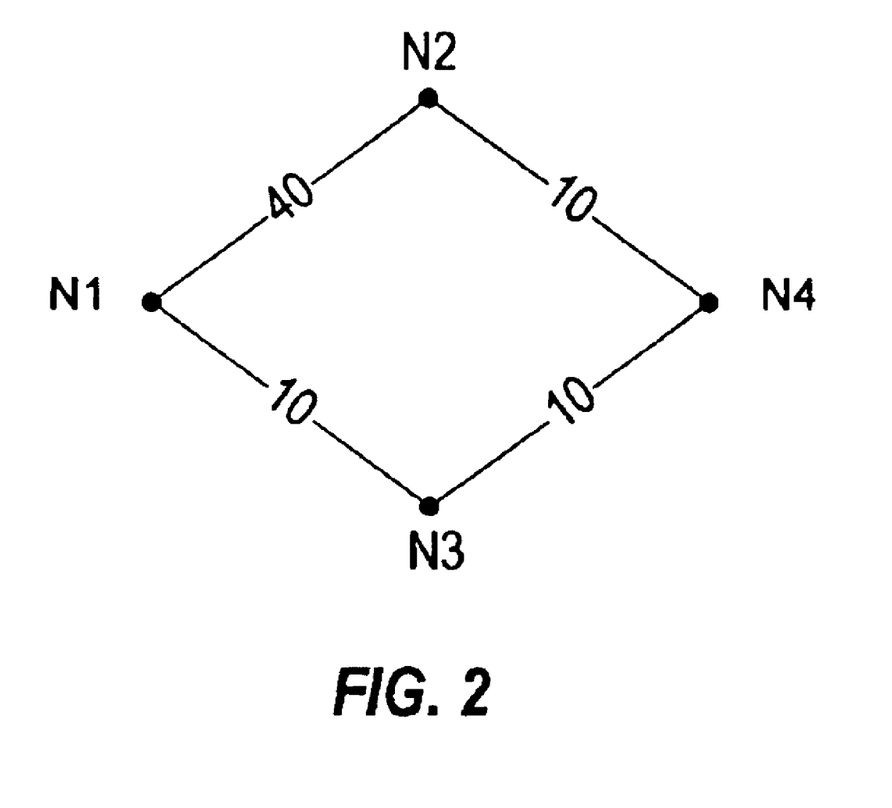
FIG. 2 illustrates a simplified representation of a four-node network, and the associated link metrics.
Figure 3:
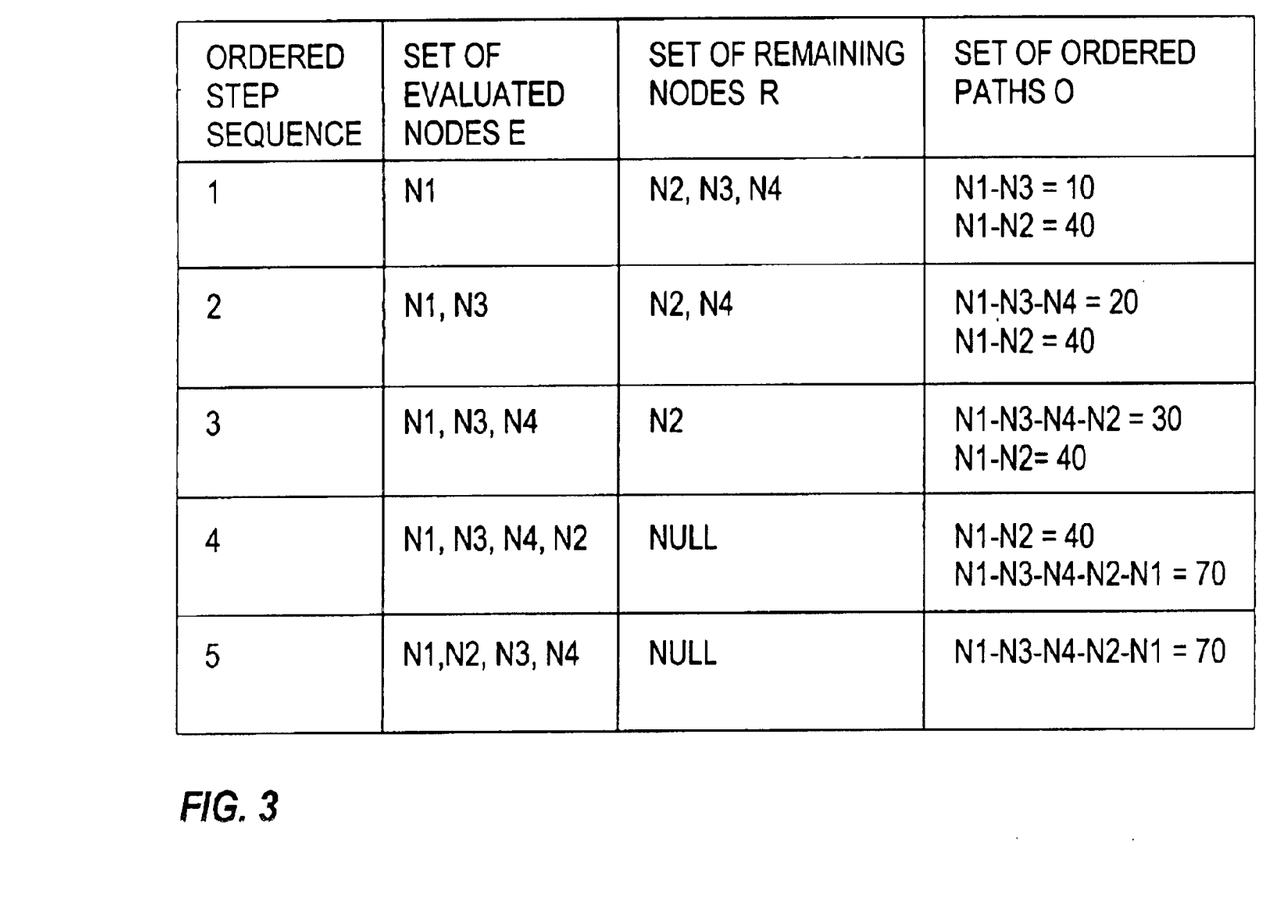
FIG. 3 illustrates a step by step execution of Dijkstra's SPT algorithm on the network shown in FIG. 2.

Dijkstra's algorithm, or SPT algorithm, is well known to those skilled in the art as a method for determining the shortest path between two network elements and is described in *Routing in the Internet*, authored by Christian Huitema, published by Prentice Hall, 1995, which is incorporated herein by reference. The process flow of Dijkstra's SPT algorithm for determining the shortest path between one network element, the source node, and all other network elements or nodes in the network is illustrated in FIG. 1. FIG. 2 shows a simplified representation of a four-node network, and the associated link metrics. FIG. 3 shows a table illustrating the step by step execution of Dijkstra's SPT algorithm as shown in FIG. 1, on the network shown in FIG. 2, with node N1 as the source node.

In addition to the least cost or shortest path analysis, many communication networks require a high level of reliability.

In such networks, a communication failure is relatively intolerable, and the need to insure adequate redundancy of communication channels in the event of a failure is paramount.

Synchronous Optical Networks (SONETs) and Synchronous Digital Hierarchy (SDH) networks are examples of such networks. When used herein, the term SONET is meant to include both SONET and SDH, the terms SONET and SDH being used interchangeably. Due to the nature of a SONET, the probability of a link or span failure due to a fiber cut, or other network element failure is significant enough to warrant the routing of protection circuits. Establishing protection insures that in the event that the primary communication circuit fails, there is an alternate predefined circuit available to be used such that minimal interruption of service occurs.

For routing protected circuits in SONETs, it is useful to think of the path taken by circuits as comprised of path segments. Each path segment in the circuit is protected either due to the fact that each of the lines used by the segment is inherently protected, or by a redundant or back-up path segment. In a first instance, known as line protection, there is a redundant line or link for each link in a path. If the link fails for any reason, the network traffic traversing that failed link is switched to the redundant link. Such line protection schemes such as Bi-directional Line Switched Rings (BLSR), the linear 1+1, and others are well known to those skilled in the art. In a second instance, that of path protection, the path itself is protected due to the existence of a predefined alternative path, which functions as a redundant path to be used in the event of a failure of any part of the primary path segment. The primary path and its corresponding predefined alternative path, as a pair, represent an example of path protection. Such path protection schemes such as UPSR are also well known to those skilled in the art. Path protection can also be thought of at the path segment level. Since a path can be thought of as a number of contiguous path segments, with some segments inherently protected while others are unprotected, it becomes desirable to establish protection for the unprotected path segments.

Establishing path protection entails establishing path segment protection for each unprotected path segment. This requires the finding of an alternate path segment. This is referred to as a Virtual UPSR in SONET terminology. Each Path Switched Segment (PSS) is made up of a primary path segment and an alternate path segment. The two segments together form the Protected Path Switch Segment (PPSS). Further details regarding SONET protection schemes can be found in Bellcore specifications GR-253-CORE, GR-1400-CORE, and GR-1230-CORE, which are incorporated herein by reference. Typically, when provisioning circuits for network traffic, paths which are not protected are identified as such. These unprotected paths contain path segments that are not part of any inherent protection scheme. For instance, if the path segment itself is not part of a predefined path protection scheme, or if the segment contains individual links that are not part of a line protection scheme, the path is unprotected. For these unprotected paths, if an alternate edge disjoint path can be found which connects the same two nodes, then this alternate path can be used as the redundant back-up path, and the original path can be defined as being path protected. This is a way to ensure that every path segment within a path is protected.

Figure 4:
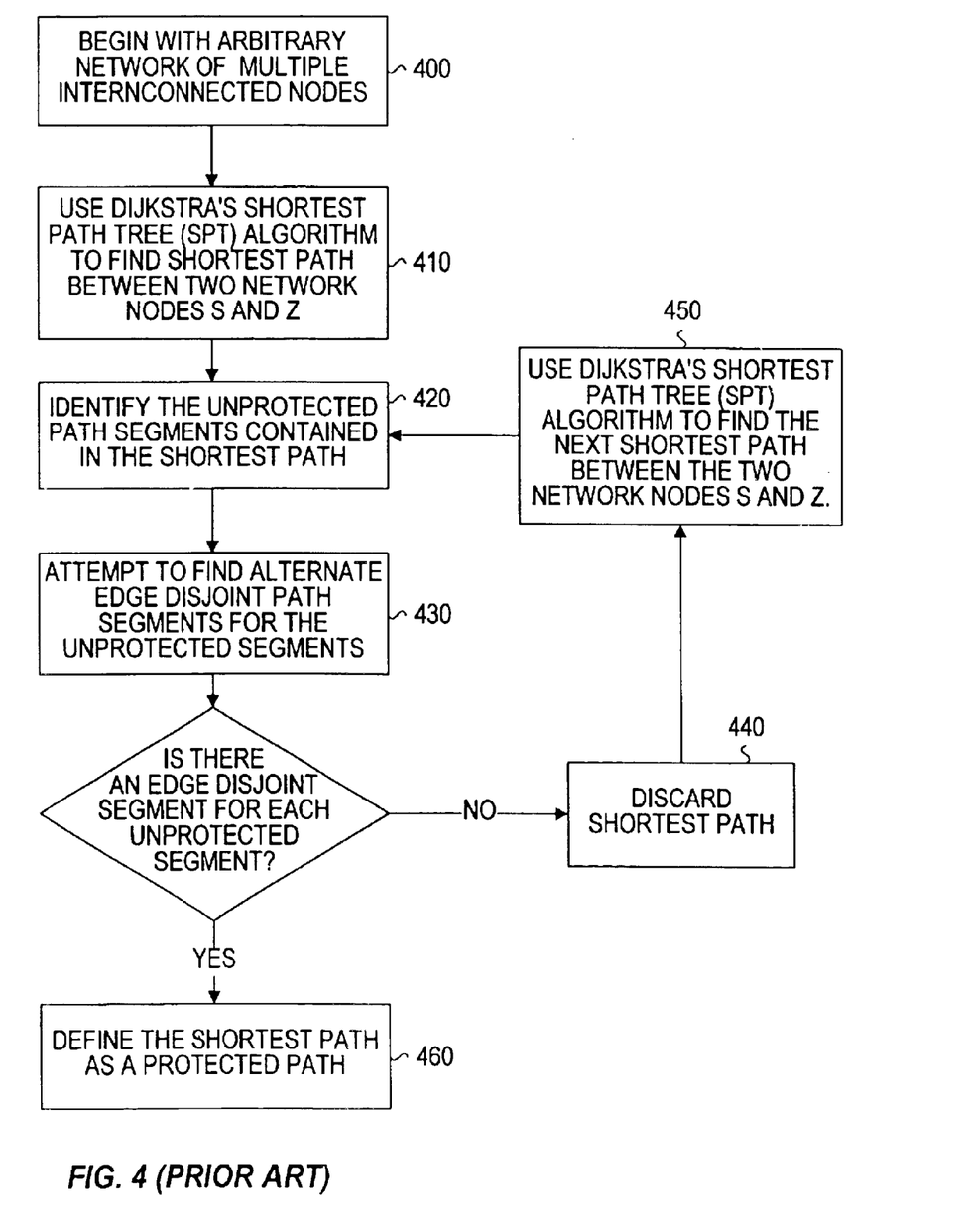
FIG. 4 illustrates a prior art process for defining protected paths within a network.

Networks in general, and SONETs in particular, may be configured to use, among others, Dijkstra's SPT algorithm to determine shortest paths for routing information between any two network elements. However, the SPT algorithm routes traffic based on the shortest path between nodes and does not account for or insure that the routed path is protected. The paths found by Dijkstra's SPT algorithm between two distant network elements are comprised of path segments between the intervening network elements. Some of these segments may be inherently protected due to the SONET configuration (BLSW, 1+1, UPSR, etc.), but other segments may be unprotected. Because protection may be a critical requirement in the provisioning of circuits, particularly in SONETs, there is a desire to obtain not only the shortest path between two network elements but the shortest protected path between those elements. One approach to finding the shortest protected path is now described. First, the shortest path is found using Dijkstra's SPT algorithm. Then, a determination is made as to whether or not the given path is protected. More specifically, a determination is made as to which path segments are not protected. If, as is common, one or more path segments are found to be unprotected, a search for an alternate path segment, or edge disjoint path segment, is made in order to provide redundancy protection for the unprotected segment. If an alternate edge disjoint path segment is found for the unprotected primary path segment, then that primary path segment can be defined as protected. If each unprotected path segment in a given path can be protected by means of finding an alternate path segment, then the entire path can be defined as protected. FIG. 4 shows a process for defining protected paths within a network. Given a network of linked network elements, and desiring to find the shortest protected path from one node S, to another node Z in the network:

1) Use Dijkstra's SPT algorithm to find the shortest path between the source node S and the destination node Z (410).
2) For the shortest path found in step 1, determine which path segments contained in the path are not protected (420).
3) For each unprotected path segments identified in step 2, attempt to find an alternate edge disjoint path segment (430). An alternate edge disjoint path segment is one that follows a different and disjoint path, yet shares the same two terminal nodes as that of the primary segment.
4) If an edge disjoint segment cannot be found for each unprotected path segment, discard the shortest path found in step 1 (440), continue Dijkstra's algorithm to find the next shortest path between nodes S and Z (450).
5) Define the protected paths (460). Define as protected, those paths for which each of the unprotected segments found in step 2 have an alternate edge disjoint path segment.

It is not uncommon however, for the shortest path determined by Dijkstra's algorithm to contain path segments which are not only unprotected, but which are also unprotectable. That is, edge disjoint path segments cannot be found or do not exist for those unprotected path segments, and thus those path segments cannot be protected (i.e., are unprotectable). In this case, since an alternate path cannot be found for at least one unprotected path segment in the path, the path itself cannot be protected and should not be used where protection is required. The path must be discarded from consideration and another path must be searched for. This proves inefficient and wasteful in that valuable time and computational resources are used to search for alternate edge disjoint paths even though no such alternate path exists. A new shortest path must also be computed because the shortest path found initially is discarded for lack of protectability. This cycle could be wastefully repeated numerous times until a protectable path is found.

While routing UPSR path segments in a graph, there may be several equal distance paths to choose the shortest path from. That is, Dijkstra's algorithm can find multiple equal cost shortest paths between two network elements, when such multiple paths exist. For each of these shortest paths an edge disjoint alternate path may or may not exist. Choosing a certain path as the shortest path may minimize or eliminate the chance of finding an alternate path segment. The algorithm may choose one of the shortest paths which does not have an alternate edge disjoint path. It is undesirable to utilize paths which do not have an edge disjoint path because those paths do not provide complete path redundancy.

For the foregoing reasons, there is a need for a method for identifying and selecting a shortest path which has an edge disjoint alternate path, when there exists more than one equal cost shortest path. The ability to select the shortest path which has an edge disjoint alternate path will significantly enhance the speed at which path protected network routing and circuit provisioning is effected.

SUMMARY OF THE INVENTION

A new algorithm is utilized to identify and select a shortest path between two network elements for which there is an alternate edge disjoint path such that a virtual Unidirectional Path Switched Ring (UPSR) can be established.

An object of the invention is to choose, when there exists multiple equal cost shortest paths between two network elements, a particular shortest path which has an alternate edge disjoint path and is thus able to be path protected. Another object of the invention is to increase efficiency in the utilization of system and computational resources by selecting one path, out of potentially multiple equal cost shortest paths, which has an edge disjoint path.

It is a further object of the invention to improve the efficiency of and reduce the computational resources required for routing protected paths within communication networks.

When path protection is required and when there exists multiple shortest paths between two network elements, it is desirable to choose, as the shortest path, a path which has an alternate and edge disjoint path such that path protection may be established. The invention uses a new algorithm to accomplish this objective. The algorithm identifies and marks each node which is the destination node in two or more shortest equal cost paths between the same source node and the destination node. The algorithm then examines the immediately preceding parent node in both equal cost shortest paths, and chooses the path for which the parent node is not marked, thereby choosing a shortest path which has an alternate edge disjoint path.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. More specifically, the invention may be implemented on a variety of hardware and software platforms, and is not limited to any particular processor, hardware configuration, operating system, or development language, as will be evident to those skilled in the art.

Dijkstra's Shortest Path Tree (SPT) algorithm computes a SPT. When a node is visited for the first time, a shortest path to that node has been found and the links which extend from that node are each concatenated onto that path to form new paths and extend the SPT. There may be, however, more than one shortest path to the same node. The order in which these multiple shortest paths are generated as the SPT is built may be arbitrary. There is not a general way to determine which of the multiple shortest paths to a given node will be created or "found" first. Only the first shortest path found to a particular node is considered in the construction of the SPT, and the algorithm essentially discards and ignores any other shortest paths to that node.

This invention comprises a new algorithm which operates to consider multiple shortest paths such that if multiple shortest paths from the source node to a particular destination node exist, the algorithm selects a shortest path which has an alternate edge disjoint path which can be used for path protection. The particular shortest path chosen by the new algorithm is thus not necessarily the first shortest path found by the algorithm. This selection of a shortest path which has an edge disjoint path is advantageous when provisioning virtual Unidirectional Path Switched Rings (UPSR) protected paths in networks, such as Synchronous Optical Networks (SONETs). A first step in provisioning such a circuit between two nodes is to identify the shortest path between the two nodes.

When using the basic form of Dijkstra's algorithm to find the shortest path, the first shortest path encountered will be designated as the shortest path between respective nodes. The next step in the provisioning process is to find an alternate path which is edge disjoint to the shortest primary path. If an edge disjoint path is found, then it along with the primary path (i.e. the shortest path) form a path-protected pair, also known as a virtual UPSR. However, there may not be an alternate edge disjoint path to the particular first shortest path found by Dijkstra's SPT algorithm. In this case, the shortest path found by the algorithm cannot be path protected. There may however be other shortest paths between the two nodes which do have alternate edge paths, and thus which could be path protected. Dijkstra's algorithm does not consider these other shortest paths, but only considers the first shortest path found. Using Dijkstra's algorithm to find the shortest path, therefore, can lead to an unprotectable shortest path although there is one or more other equal cost shortest paths that can be protected.

Figure 5:
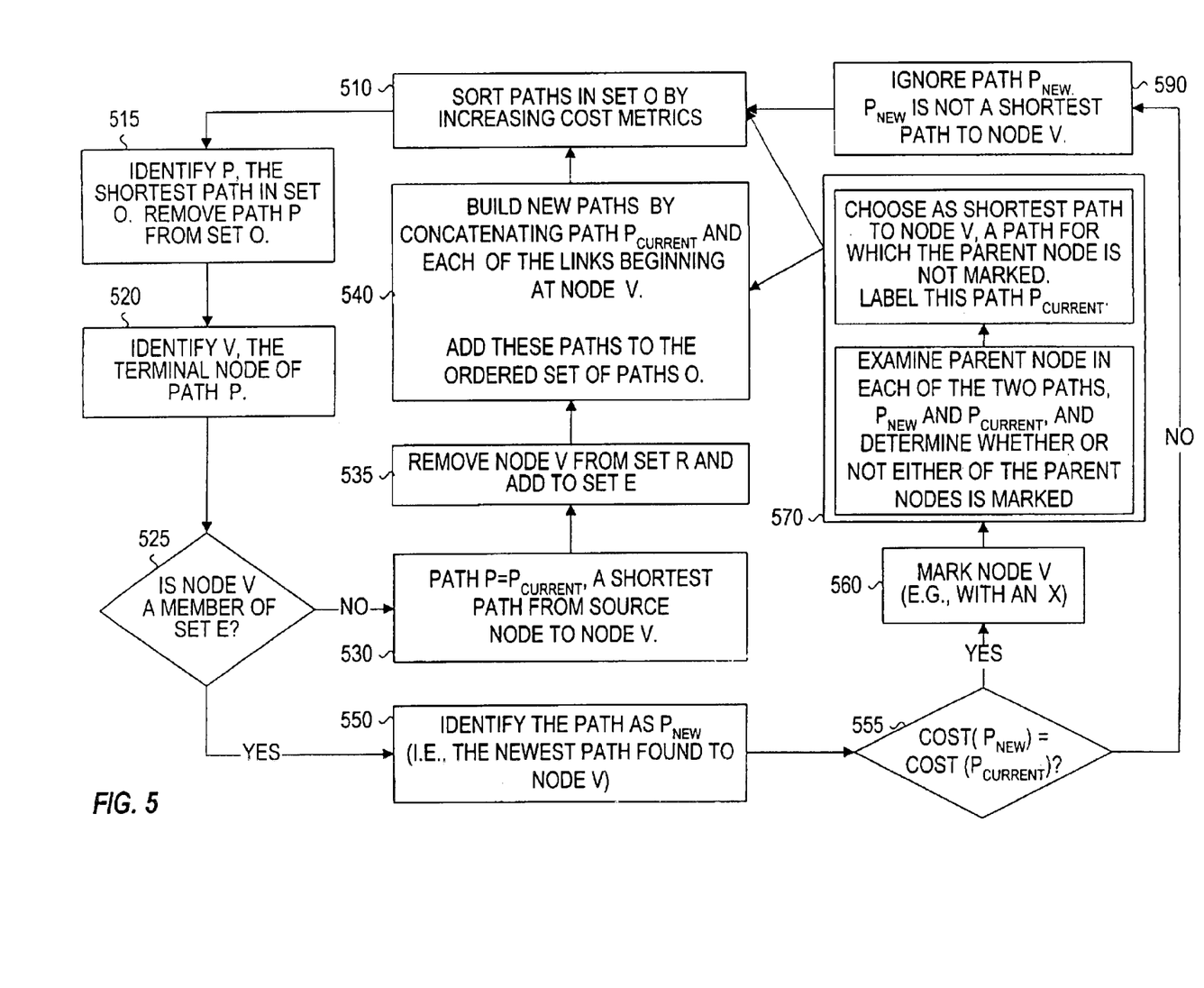
FIG. 5 illustrates a portion of the new algorithm which finds and chooses the shortest path according to one embodiment of the invention.

The new algorithm which is depicted in FIG. 5, takes the aforementioned shortcoming into account. The new algorithm examines all shortest paths to a particular node, not only the first shortest path found. The fact that each of the shortest paths is examined before a particular shortest path is chosen allows the algorithm to choose one shortest path over another. The new algorithm chooses one of multiple equal cost shortest paths having an edge disjoint alternate path. The shortest path selected is thus one which is able to be protected.

The new algorithm works as follows:
(a) all shortest paths are found between a source node and a destination node;
(b) whenever two (or more) equal cost shortest paths to a particular node are found, the node is marked;
(c) the shortest path chosen is the first shortest path found unless the immediately preceding parent node of the first path is marked and there is another shortest path for which the parent node is not marked, in which case the shortest path with an unmarked parent node is selected as the shortest path.

FIG. 5 illustrates the elements of the new algorithm. Some of the process flow elements to Dijkstra's algorithm which appear in FIG. 1, and which are common to the new algorithm, have been omitted from FIG. 5 for the sake of clarity, but it is to be understood that according to the new algorithm the initialization of sets E, R, and O, and the termination of the algorithm in the case that O is empty or for which the shortest path in O is of infinite cost, proceeds according to FIG. 1.

Figure 7:
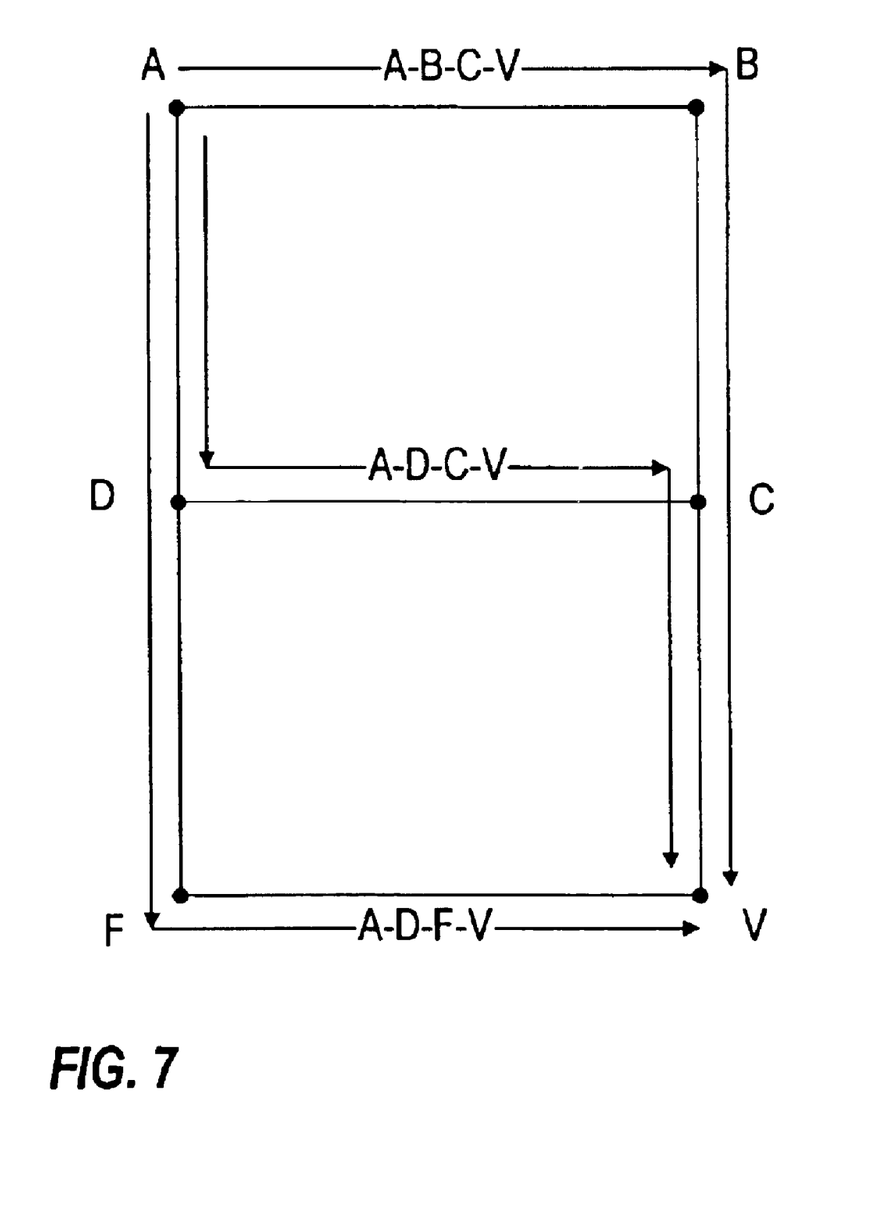
FIG. 7 illustrates a simple mesh network consisting of six nodes connected by links.
Figure 8:
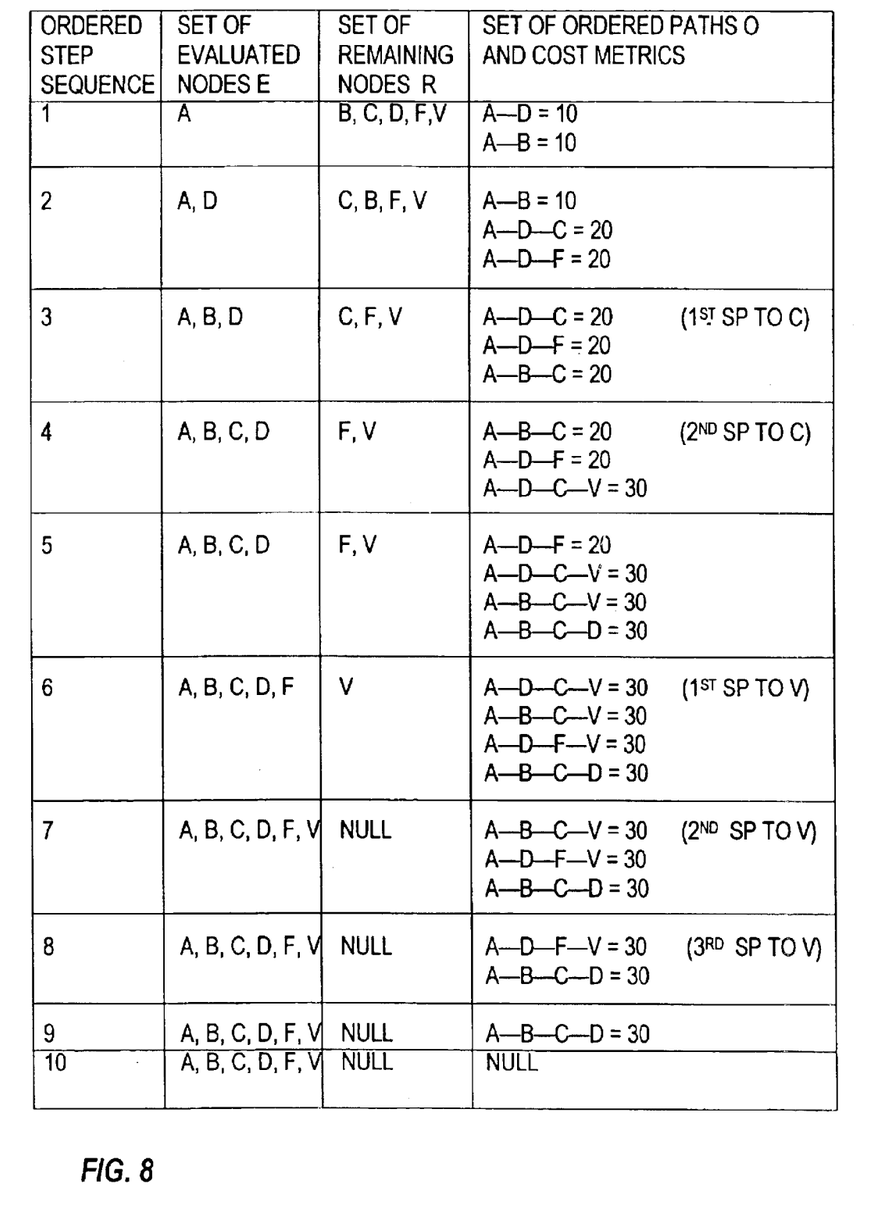
FIG. 8 illustrates the step by step execution of the new algorithm on the mesh network shown in FIG. 7, according to the present invention.

The new algorithm will now be described by way of an example. FIG. 7 illustrates a simple mesh network consisting of six nodes; A, B, C, D, F, and V connected by links. In this network, all links have the same cost metric, 10. FIG. 8 illustrates the sequential steps of the new algorithm, the set of evaluated nodes, E, the set of remaining (i.e., not yet evaluated) nodes, R, and the set of ordered paths, O, with the paths' cost metrics.

In step 1 of this example, node A is chosen as the source node and it alone comprises the initial set of evaluated nodes E. The set of remaining nodes R consists of all the other nodes in the network, in this case B, C, D, F, and V. The initial set of ordered paths O contains the two links beginning from the source A, A-B and A-D, with their respective cost metrics.

At step 2, a shortest path P in O, in this case A-D, is removed from O and the terminating node, D, is removed from R and added to E. New paths are constructed by concatenating P with the outgoing links beginning at P's terminal node D. There are two such links in this case yielding two new paths. These new paths, A-D-C and A-D-F, are added to the ordered set O and O is sorted according to increasing cost. Note that the path A-B could also have been chosen as the shortest path since it too has a minimum cost among the paths in O at step 1.

At step 3, the recursive algorithm again identifies the shortest path in O, A-B, and removes it from O. The terminating node, B, is removed from set R and added to set E. New paths are created and inserted into set O by concatenating the most recent path, A-B, with the outgoing links from that path's terminal node, B. As is evident from FIG. 7, there is one outgoing link from node B, and this is appended to the current shortest path A-B to form the path, A-B-C. There are now three equal cost paths in O. So far, the example has utilized elements within the loop 510–540 of FIG. 5.

At step 4, a least cost path, A-D-C is removed from O. This is the first time that node C has been visited and C is removed from R and placed into E. New candidate paths are constructed by appending the path A-D-C with any additional outgoing links from C. There is one such link, and the new candidate path formed is A-D-C-V.

At step 5, a current shortest path selected and removed from O is A-B-C. In this case, the terminal node C has already been evaluated (i.e. visited). According to the basic form of Dijkstra's algorithm (see FIGS. 1–3), the path would effectively be ignored, since a shortest path to node C has already been found. That is, a new set of candidate paths would not be generated by appending the outgoing links of C to path A-B-C. However, the new algorithm, according to one embodiment of the present invention, does not simply discard the path. Instead the new path is designated $P_{new}$ (550). Then the algorithm checks to see if $P_{new}$ has the same cost as that of the first shortest path found to C, designated $P_{current}$ (555). If the costs are not equal (555 No), then the algorithm ignores the path $P_{new}$ and proceeds to consider again the paths in O (510). However, if the costs of the paths are equal (555-Yes), then the terminal node is marked, in this example, with an X (560). Referring back to step 5 of FIG. 8, the costs of $P_{new}$ and of $P_{current}$ are equal, so node C is marked.

Figure 6:
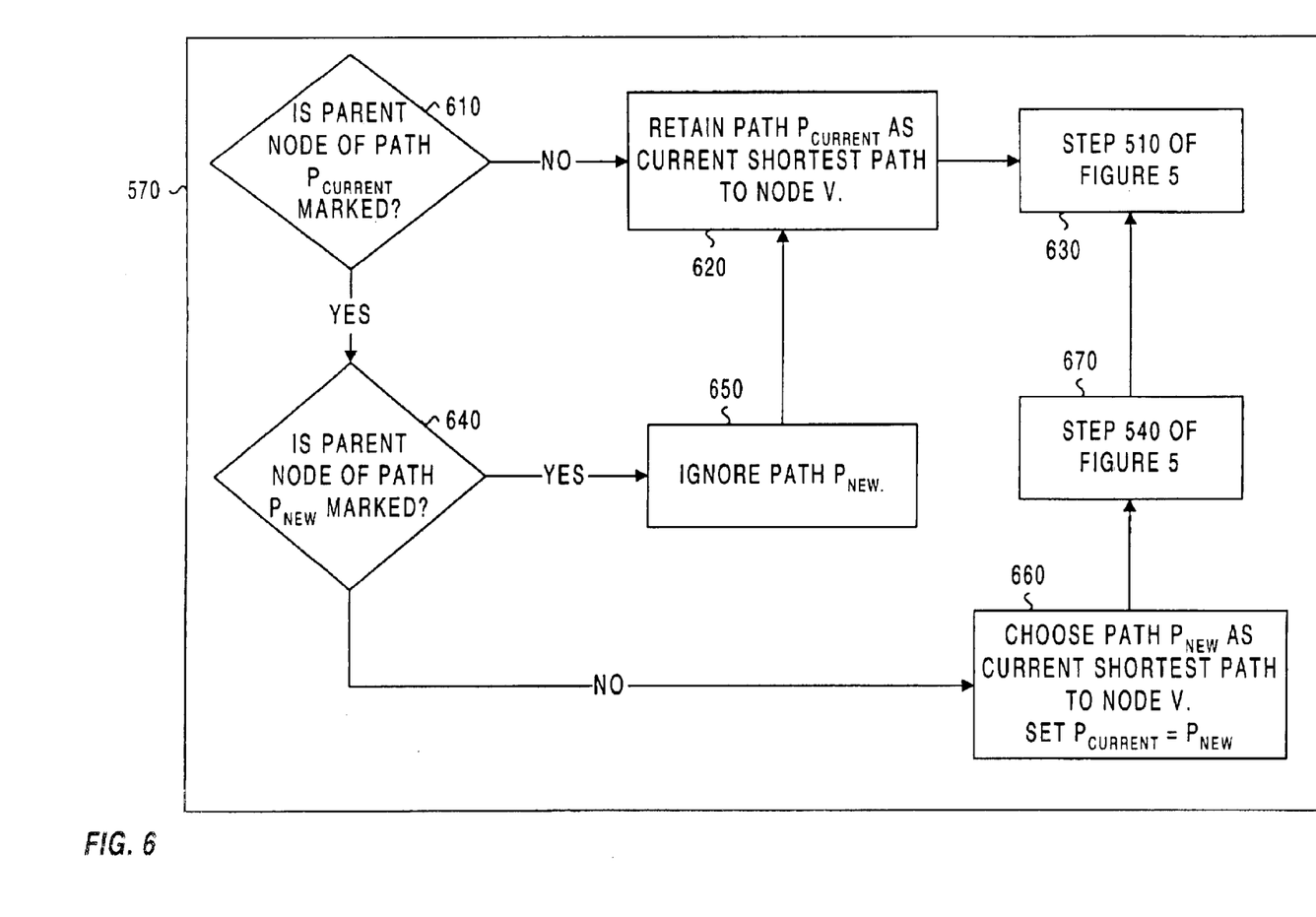
FIG. 6 illustrates the procedure by which one of multiple shortest paths is chosen by the new algorithm.

Next, the new algorithm determines which of these equal cost shortest paths to node C should be used to continue building the SPT (570). FIG. 6 is an expanded diagram of element 570 in FIG. 5, and shows how the algorithm determines which of the two shortest paths to retain and use. First, the parent node of the first shortest path $P_{current}$ is examined to determine whether or not the parent node is marked (610). The parent node in a path is the node which immediately precedes the terminal node of that path. In this example $P_{current}$=A-D-C. The parent node is D and it is unmarked. In this circumstance, $P_{current}$ is retained as the shortest path to node C (620) and the algorithm returns to considering the set O (630). Note that node C is now marked indicating that there are at least two equal cost shortest paths to node C from source node A.

The algorithm continues at step 6, removing the shortest path A-D-F from O, removing node F from R and adding it to E, and constructing the new path A-D-F-V. At the end of step 6, there are four equal cost paths in O. Three of these paths terminate at node V, and thus there are three equal cost shortest paths from source node A to the node V; A-D-C-V, A-B-C-V, and A-D-F-V. Paths A-B-C-V and A-D-F-V are mutually edge disjoint, whereas path A-D-C-V does not have an alternate edge disjoint path. Thus, it would be preferential to select one of the two mutually disjoint paths as the shortest path whenever path protection is required. If the path A-D-C-V is chosen, it will not be able to be protected.

Dijkstra's algorithm, in its basic form, will choose one of these three paths in an arbitrary way, as discussed earlier. The path chosen will be the first one encountered in set O. This arbitrary selection of the shortest path, when there are multiple shortest paths from which to choose, could prove detrimental when path protection is required. Because Dijkstra's algorithm potentially chooses from multiple shortest paths in an arbitrary way, it is possible that the algorithm will choose a shortest path which does not have an edge disjoint path, even though there are one or more other shortest paths which do have an alternate disjoint path. For instance, the path A-D-C-V could be chosen without regard to the fact that path protection could not be established for that primary path, and even though there are other shortest paths which are protectable. This is precisely what occurs in step 7 of FIG. 8, where the first shortest path chosen is the one without an alternate disjoint path. However, due to the innovative algorithm embodied in the present invention, this choice of an unprotectable shortest path is not final, and as will be seen, a subsequent protectable shortest path will be selected and used instead.

Referring again to step 7 of FIG. 8, path A-D-C-V is considered. The path is removed from O and the terminal node is moved from set R to set E. This is the first shortest path to node V and is designated $P_{current}$. At step 8, path A-B-C-V is considered, which is the second path found to node V, and is designated $P_{new}$. The new algorithm compares the cost of $P_{current}$ and $P_{new}$ (555), and if they are equal (555-Yes) the terminal node V is marked (560). If $P_{new}$ and $P_{current}$ are not equal (555-No), $P_{new}$ is discarded (590). In the example of FIGS. 7 and 8, the costs of each path are equal and node V is marked. In order to determine which of these two shortest paths to actually use, the immediate predecessor or parent node in each path, of the terminal node V is examined to determine whether or not it is marked (570). In this case, the parent node in each of the two paths, A-B-C-V and A-D-C-V, is the node C. Node C is marked, as shown above. According to the algorithm (610, 640, 650, 620), if both parent nodes in both shortest paths are marked, then $P_{new}$ will be discarded and $P_{current}$ will be retained as the Shortest path. Since the parent node in both paths, C, is marked, path A-D-C-V is retained as $P_{current}$.

The last path to node V is considered at step 9. This path, A-D-F-V is the third of three shortest paths to V. This path is now designated $P_{new}$ and is determined to be equal in cost to $P_{current}$. Next, the parent node in each of the two paths is examined to determine whether or not it is marked. In this case, the parent node of $P_{new}$ is node F and the parent node of $P_{current}$ is node C. Node C is marked whereas node F is not marked. According to the algorithm (610, 640, 660), the shortest path chosen is the one in which the parent node is not marked. Thus $P_{current}$ will be replaced by $P_{new}$ and $P_{new}$ will be redesignated as $P_{current}$. The unprotectable shortest path A-D-C-V has been replaced by the protectable shortest path A-D-F-V. It is clear then, that the object of the invention has been accomplished. The path originally and arbitrarily selected by Dijkstra's algorithm, A-D-C-V, does not have an edge disjoint alternate path and thus could not have been protected. By considering each of the shortest paths found, and selecting a path for which the parent node is not marked, a shortest path is chosen which has an edge disjoint alternate path, and which therefore can be path protected.

In summary, when path protection is required for an unprotected path, an alternate and edge disjoint path must be found to serve as the redundant path. The primary path and alternate edge disjoint path, as a pair, from a path protected virtual UPSR. If an edge disjoint path cannot be found (i.e. does not exist) then the primary path cannot be protected. Thus, when a path protection is required, a primary shortest path which has an edge disjoint path must be selected so a virtual UPSR can be ultimately defined.

The methods described herein, as will be evident to those of ordinary skill in the art, can be implemented as software programs which can be stored on computer readable media, and which can be executed on a variety of hardware/software platforms. In addition, the methods described herein can be coded in a variety of programming languages including but not limited to the object oriented languages JAVA and C++, and such code can be interpreted, compiled, stored and executed on a variety of platforms as will be evident to those skilled in the art.

Although this invention has been illustrated by reference to specific embodiments, it will be apparent to those skilled in the art that various changes and modifications may be made which clearly fall within the scope of the invention. The implementation of the invention is not in any way restricted to particular software methods. As will be evident to those skilled in the art, the generic methods described herein can be implemented in many different ways. The invention is intended to be protected broadly within the spirit and scope of the appended claims.

What is claimed is:

1. In a data communication network, a method for selecting protectable paths through a network by developing a shortest path tree rooted at a first node, said method comprising:

identifying a plurality of shortest paths having equal costs from said first node to a second node;

identifying one of said plurality of shortest paths that has an edge disjoint alternate path and is thus protectable by examining a parent node of each of said plurality of shortest paths to be one for which the parent node has not been marked, indicating that there is not a plurality of equal cost shortest paths to said parent node from said first node, said parent node being a last node before said second node on any path to said second node; and marking said second node to indicate a plurality of shortest paths having equal costs from said first node to said second node.

2. The method of claim 1 further comprising:

using said set of paths in computation of a shortest path tree.

3. The method of claim 1 wherein said each of said shortest paths comprises either an individual path segment or a plurality of contiguous path segments, each of said path segments comprises an individual link or a plurality of contiguous links, and each of said links comprises a communications channel between two adjacent nodes.

4. The method of claim 1 wherein said equal costs are determined in accordance with a cost metric defined for said links of said network.

5. The method of claim 1 wherein at least one of said plurality of shortest paths was found in preceding computations in developing a shortest path tree.

6. In a data communication network, a computer program product for selecting protectable paths through a network by developing a shortest path tree rooted at a first node, said computer program product comprising:

code that causes identification of a plurality of shortest paths having equal costs from said first node to a second node;

code that causes identification of one of said plurality of shortest paths that has an edge disjoint alternate path and is thus protectable by examining a parent node of each of said plurality of shortest paths to be one for which the parent node has not been marked, indicating that there is not a plurality of equal cost shortest paths to said parent node from said first node, said parent node being a last node before said second node on any path to said second node;

code that causes marking of said second node to indicate a plurality of equal cost shortest paths from said first node to said second node; and a computer-readable storage medium that stores the codes.

7. The computer program product of claim 6 further comprising:

code that uses said set of paths in computation of a shortest path tree.

8. The computer program product of claim 6 wherein each of said shortest paths comprises either an individual path segment or a plurality of contiguous path segments, each of said path segments comprises an individual link or a plurality of contiguous links, and each of said links comprises a communications channel between two adjacent nodes.

9. The computer program product of claim 6 wherein said equal costs are determined in accordance with a cost metric defined for said links of said network.

10. The computer program product of claim 6 wherein at least one of said plurality of shortest paths was found in preceding computations in developing a shortest path tree.

11. In a data communication network, apparatus for selecting protectable paths through a network by developing a shortest path tree rooted at a first node, said apparatus comprising:

means for identifying a plurality of shortest paths having equal costs from said first node to a second node;

means for selecting one of said plurality of shortest paths that has an edge disjoint alternate path and is thus protectable by examining a parent node of each of said plurality of shortest paths to be one for which the parent node has not been marked, indicating that there is not a plurality of equal cost shortest paths to said parent node from said first node, said parent node being a last node before said second node on any path to said second node; and means for marking said second node to indicate a plurality of equal cost shortest paths from said first node to said second node.

12. The apparatus of claim 11 further comprising:

means for using said set of paths in computation of a shortest path tree.

13. The apparatus of claim 11 wherein said each of said shortest paths comprises either an individual path segment or a plurality of contiguous path segments, each of said path segments comprises an individual link or a plurality of contiguous links, and each of said links comprises a communications channel between two adjacent nodes.

14. The apparatus of claim 11 wherein said equal costs are determined in accordance with a cost metric defined for said links of said network.

15. The apparatus of claim 11 wherein at least one of said plurality of shortest paths was found in preceding computations in developing a shortest path tree.

16. The method of claim 1 further comprising:

adding one or more new path(s) to a set of paths in said network, said new path(s) including said identified shortest path and extending beyond said second node to one or more destination nodes adjacent to said second node.

17. The computer program product of claim 6 further comprising:

code that causes addition of one or more new path(s) to a set of paths in said network, said new path(s) including said identified shortest path and extending beyond said second node to one or more destination nodes adjacent to said second node.

18. The apparatus of claim 11 further comprising:

means for adding one or more new path(s) to a set of paths in said network, said new path(s) including said identified shortest path and extending beyond said second node to one or more destination nodes adjacent to said second node.

19. In a data communication network, apparatus for selecting protectable paths through a network by developing a shortest path tree rooted at a first node, said apparatus comprising:

a processor; and a computer-readable storage medium storing software for execution by said processor, said software comprising:

code that causes identification of a plurality of shortest paths having equal costs from said first node to a second node;

code that causes identification of one of said plurality of shortest paths that has an edge disjoint alternate path and is thus protectable by examining a parent node of each of said plurality of shortest paths to be one for which the parent node has not been marked, indicating that there is not a plurality of equal cost shortest paths to said parent node from said first node, said parent node being a last node before said second node on any path to said second node; and code that causes marking of said second node to indicate a plurality of equal cost shortest paths from said first node to said second node.

20. The apparatus of claim 19 wherein said software further comprises:

code that uses said set of paths in computation of a shortest path tree.

21. The apparatus of claim 19 wherein each of said shortest paths comprises either an individual path segment or a plurality of contiguous path segments, each of said path segments comprises an individual link or a plurality of contiguous links, and each of said links comprises a communications channel between two adjacent nodes.

22. The apparatus of claim 19 wherein said equal costs are determined in accordance with a cost metric defined for said links of said network.

23. The apparatus of claim 19 wherein at least one of said plurality of shortest paths was found in preceding computations in developing a shortest path tree.

24. The apparatus of claim 19 wherein said software further comprises:

code that causes addition of one or more new path(s) to a set of paths in said network, said new path(s) including said identified shortest path and extending beyond said second node to one or more destination nodes adjacent to said second node.

* * * * *